No. 671,307. Patented Apr. 2, 1901.
C. H. CLARK.
SODA WATER DISPENSING FOUNTAIN.
(Application filed Feb. 4, 1899.)
(No Model.) 4 Sheets—Sheet 1.
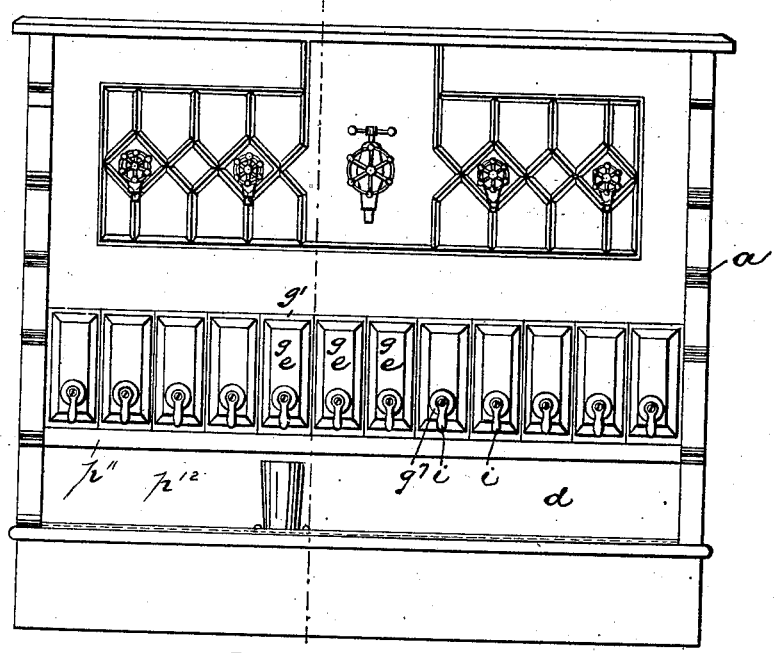
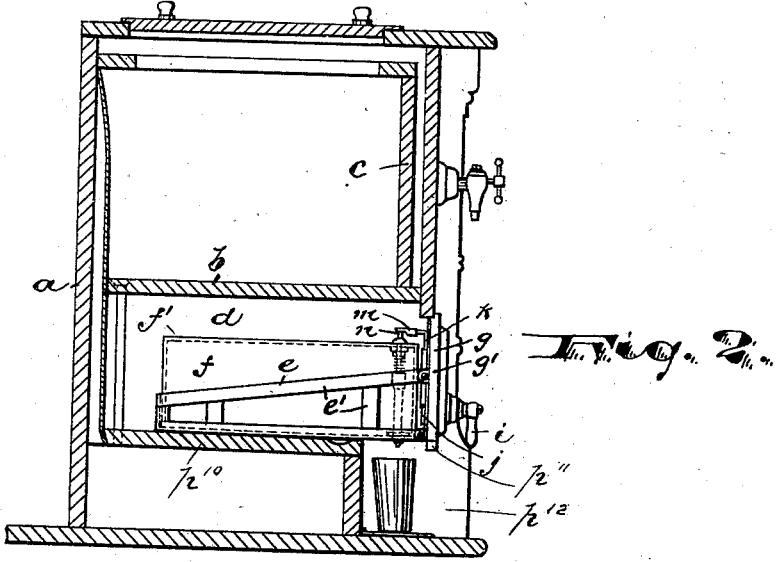
WITNESSES:
A. R. Krousse.
Russell M. Everett.
INVENTOR:
Charles H. Clark,
BY Drake & ATTY'S.

No. 671,307. Patented Apr. 2, 1901.
C. H. CLARK.
SODA WATER DISPENSING FOUNTAIN.
(Application filed Feb. 4, 1899.)
(No Model.) 4 Sheets—Sheet 2.
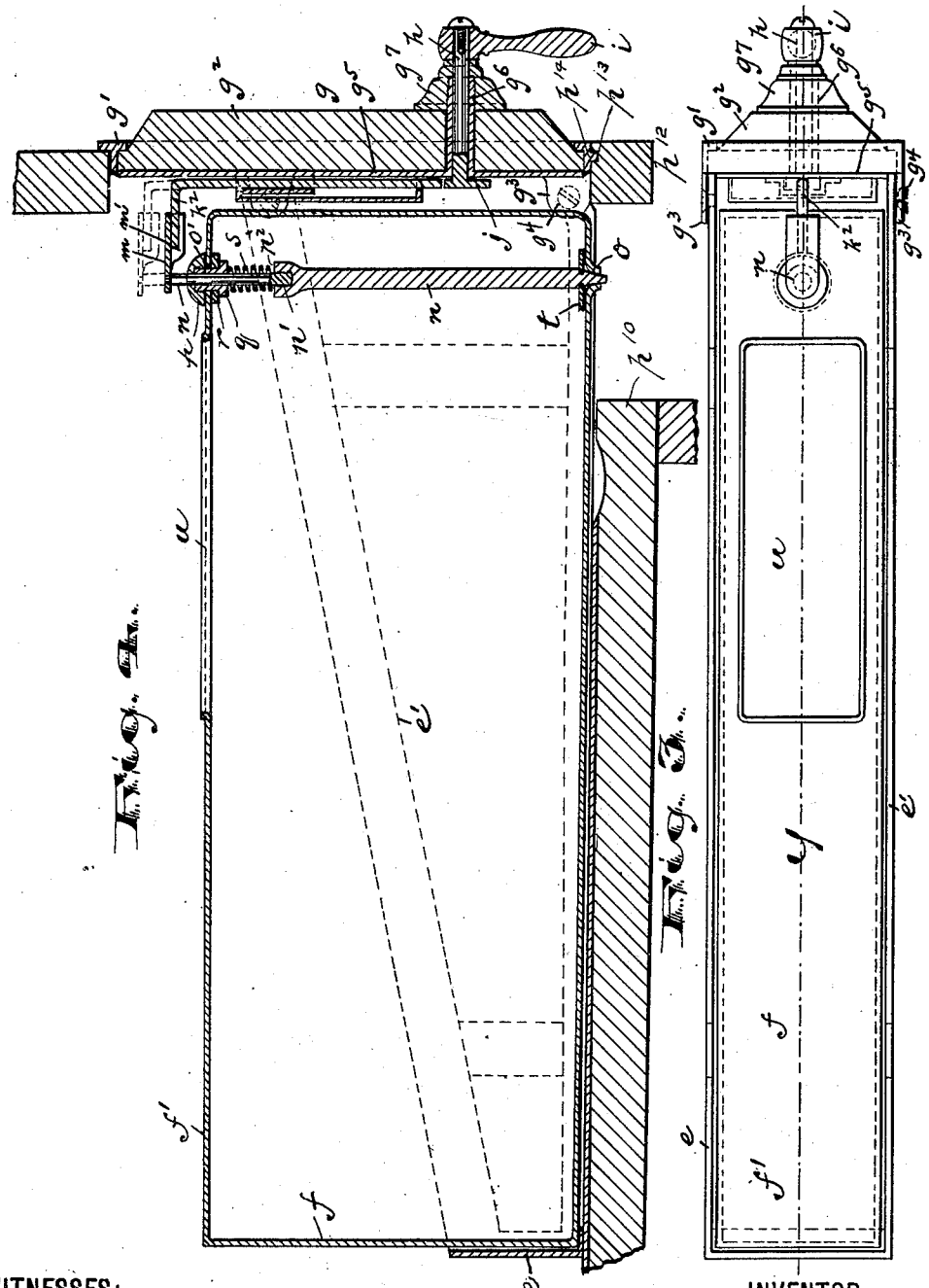
WITNESSES:
INVENTOR:
Charles H. Clark,
BY Drake & Co.
ATTY'S.

No. 671,307. Patented Apr. 2, 1901.
C. H. CLARK.
SODA WATER DISPENSING FOUNTAIN.
(Application filed Feb. 4, 1899.)
(No Model.) 4 Sheets—Sheet 3.
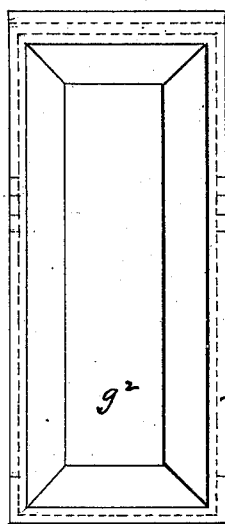
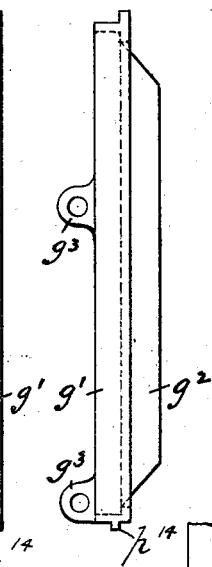
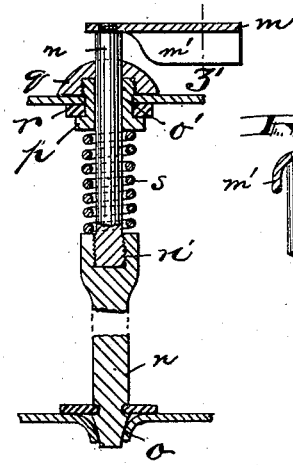
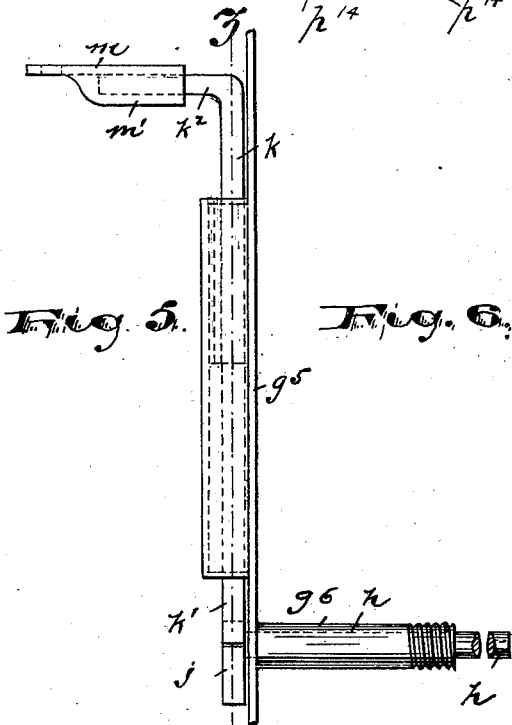
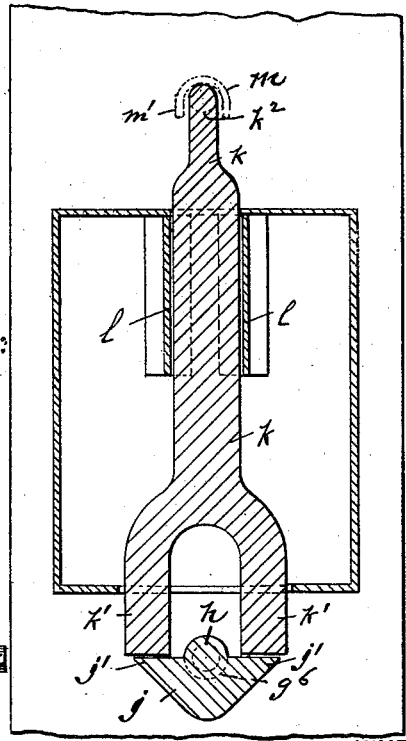
WITNESSES: INVENTOR
A. R. Krouse Charles H. Clark,
Russell M. Everett. BY Drake & G. ATTY'S.
THE NORRIS PETERS CO., PHOTO-LITHO., WASHINGTON, D. C.

No. 671,307. Patented Apr. 2, 1901.
C. H. CLARK.
SODA WATER DISPENSING FOUNTAIN.
(Application filed Feb. 4, 1899.)
(No Model.) 4 Sheets—Sheet 4.
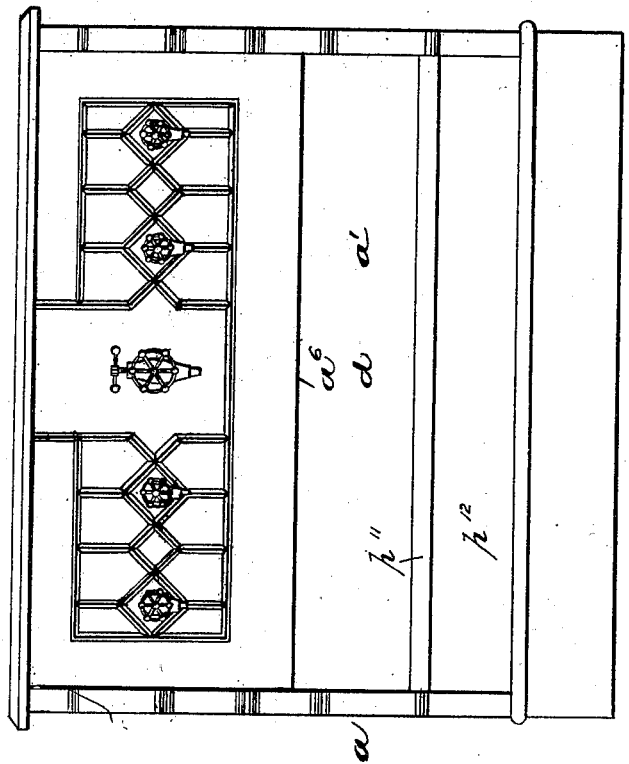
WITNESSES. INVENTOR

UNITED STATES PATENT OFFICE.

CHARLES H. CLARK, OF NEWARK, NEW JERSEY, ASSIGNOR OF ONE-HALF TO JACOB HAUSSLING, OF SAME PLACE.

SODA-WATER-DISPENSING FOUNTAIN.

SPECIFICATION forming part of Letters Patent No. 671,307, dated April 2, 1901.

Application filed February 4, 1899. Serial No. 704,530. (No model.)

*To all whom it may concern:*

Be it known that I, CHARLES H. CLARK, a citizen of the United States, residing at Newark, in the county of Essex and State of New Jersey, have invented certain new and useful Improvements in Soda-Water-Dispensing Fountains; and I do hereby declare the following to be a full, clear, and exact description of the invention, such as will enable others skilled in the art to which it appertains to make and use the same, reference being had to the accompanying drawings, and to letters of reference marked thereon, which form a part of this specification.
This invention relates to that class of fountains for carbonated fluids—such as soda-water, mineral waters, and the like—having syrup-receptacles sliding horizontally in from the front of the fountain.
The objects of the invention are to secure in such fountains greater convenience, especially in the refilling operations, to enable the parts to be cleansed with greater facility and ease and to enable the fountain to be more easily maintained in a state of cleanliness, to enable the syrup to be dispensed more quickly, to reduce the cost of construction, to avoid the disadvantages incident to the use of faucets, and to secure other advantages and results, some of which may be referred to hereinafter in connection with the description of the working parts.

The invention consists in the improved soda-water-dispensing fountain and in the arrangements and combinations of parts of the same, all substantially as will be hereinafter set forth, and finally embraced in the clauses of the claim.

Referring to the accompanying drawings, in which like letters of reference indicate corresponding parts in each of the several views, Figure 1 is a front elevation of my improved fountain. Fig. 2 is a section of the same, taken at line $x$, Fig. 1. Fig. 3 is a detail plan showing a certain sliding syrup-receptacle and coöperating parts. Fig. 4 is a section taken at line $y$, Fig. 3. Fig. 5 is a side elevation in detail, showing certain valve-operating mechanism; and Fig. 6 is a section of the same on line $z$. Fig. 7 is a front elevation of a certain onyx frame with a front plate of onyx therein, and Fig. 8 is a side view of the same. Fig. 9 is a section of a syrup-jar valve. Fig. 10 is a section at line
$z'$. Fig. 11 is a front elevation of the outer casing of the fountain with the syrup-receptacles removed.

In said drawings, $a$ indicates the outer casing of a soda-water fountain, having therein a horizontal partition $b$, on the upper side of which is formed the ice chamber or receptacle, in which the refrigerating apparatus for the carbonated fluid may be arranged in any ordinary manner. Below the said horizontal partition $b$ is formed a chamber or receptacle $d$ for the series of syrup-receptacles, to the construction and arrangements of which my invention particularly relates.

Heretofore in horizontally-sliding syrup-receptacles syrup-dispensing faucets are permanently attached to the syrup-jars, and thus because of the frequent use of the said faucets the latter become quickly worn and are caused to leak, thus involving where a large number of said fountains are in use constant repairing and expense. The use of faucets also involved the presentation of a large metallic surface to the syrup, and inasmuch as said syrup frequently contains fruit-acids and other chemical agencies the said metal soon became coated with metallic salts more or less poisonous to the drinker. In other types of fountains the syrup-receptacles are disposed vertically within the fountain-case and refilled from the top of the fountain, and in this case much inconvenience and loss of time is experienced in the filling operation and much ice is wasted, the waste being due to the opening of the ice-chamber. In my construction I avoid the inconvenience of top filling and the loss of ice incident thereto and fill the syrup-receptacles from the front of the fountain and at the same time dispense with the use of faucets and the objections arising from their use. With these ends in view I provide at the front of the case a long horizontal opening $a'$ to the interior of the lower chamber for the syrup-receptacles, the said horizontal openings $a'$ in the preferred construction being unobstructed by vertical partitions separating the syrup-receptacles from one another; but, on the contrary, the said opening is devoid of such vertical partitions and is free to permit the attendant when cleaning the interior chamber $d$ to sweep from end to end of the opening with his cloth or sponge, and thus remove any accumulation of syrup or other matter adhering to the surface of the chamber and enter into the angles or corners, where it is ordinarily difficult to remove the dirt. The walls back of the said oblong opening and around the chamber $d$ are preferably made of copper or other suitable metal lined between the chamber-walls and outer casing with asbestos, wood, or other suitable nonconductor of heat or in any way common in the art of manufacturing fountains. At the lower part of the opening $d$ is an elevated slightly-inclined platform $p^{10}$, upon which the syrup-jar receptacles are seated, the said platform at its front lying back from the front of the fountain, as indicated in Fig. 2, so that the jar-receptacles and jars may project forward from the platform when in position in the fountain to enable the tumbler or drinking-glass to be placed beneath to receive the syrup from said jars. To prevent the jars and jar-receptacles from working down the inclined platform by gravity, helped by the jarring occasioned by heavy passing vehicles or other causes, I have arranged at the front of the opening $d$, in horizontal line with the front face of the fountain or the case $a$ thereof, a horizontal bar $p^{11}$, (shown clearly in Fig. 3,) which extends from end to end of the case $a$, as in Fig. 1. This bar $p^{11}$ lies forward and away from the top of the inclined platform and substantially in the plane thereof and separates the opening $a'$, through which the jar-receptacles are passed, from the tumbler-passage $p^{12}$. At the top of the horizontal bar $p^{11}$ is a longitudinal groove $p^{13}$, Fig. 3, adapted to receive a rib $p^{14}$ (formed on the bottoms of the frames $g'$) when the receptacles $e$ are seated on the inclined platform. The ribs being formed parallel with the front of the frames $g'$, as shown in Figs. 7 and 8, the said frames when in the fountain are held from turning in the chamber $d$ as well as from sliding forward. Thus constructed the fountain-case is adapted to receive and hold the series of separable and independent jar-receptacles and to hold said receptacles at an inclination, so that the jars in turn will be inclined forward and that the fluid contents of said jars will flow forward toward the outlet at the front ends thereof. Within the chamber $d$ thus formed is arranged a series of sliding jar-receptacles $e$, in which the syrup-jars $f$ are arranged, the said receptacles $e$ at their fronts being provided with front plates $g$, which extend from the top to the bottom of the horizontal front opening, and thus when said front plates taken together close said horizontal opening to prevent the escape of cool air the front plates of contiguous receptacles lie edge to edge with neatness, so as to prevent the formation of cracks or openings, which would permit the escape of cool air. The front plates $g$ each consist, preferably, of a metallic frame $g'$, which may be of cast metal, and at the front a panel of onyx $g^2$ or other ornamental stonework fitted within a central opening in said frame. I may, however, make the front plate $g$ all of metal or in any other way suitable for the purpose. At the back of said frame $g'$ I prefer to cast ears $g^3$, which are perforated to receive screws or rivets $g^4$, and to said ears are attached the body $e'$ of the jar-receptacle, the said body and front frame being screwed or fastened together, so that the said body may be withdrawn from the chamber $d$ when draft is brought upon the front plate. The body portion $e'$ is preferably of an openwork metal, either sheet or cast, the openings through the said body permitting the attendant to observe the amount of syrup contained within the jars $f$, which jars are preferably of transparent glass. The rear or inner end of the jar-receptacle is made, preferably, lower than the front outer end to facilitate the outlifting of the jars $f$ and to reduce weight. The bottoms of the said receptacles at the front are cut away or open to permit the outflow of the syrup through the opening when the said syrup is being dispensed. At the back of the onyx or ornamental plate $g^2$ and attached to the frame $g'$ is a metal plate or lining $g^5$, which is attached to said frame in any suitable manner. This back plate or lining serves as a support or bearing for certain parts hereinafter to be described. The said back plate $g^5$ and onyx $g^2$ are both perforated at a point toward the bottom, and at the said perforation is formed a tubular forward extension $g^6$, which is attached to the back plate or lining at the perforation and passes through the perforation in the onyx and at the front is threaded to receive an ornamental bearing-plate $g^7$ and hold said bearing-plate firmly in position in front of the onyx. Within said tubes $g^6$ are arranged cam-rods $h$, to the outer ends of which are fastened handles $i$ and to the inner ends cams or lifters $j$, (shown more clearly in Figs. 5 and 6,) the said cams each comprising, preferably, a triangular plate, the arms or lifting extensions $j'$ $j'$ of which project horizontally and oppositely to provide supports for the bifurcated arms $k'$ of a sliding plate or bar $k$, arranged vertically in suitable ways $l$, formed at the back or inner face of the said back plate $g^5$, the said sliding plate $k$ at its lower ends resting upon the said horizontal arm $s$ of the cam $j$, so as to be raised thereby when the finger-piece is oscillated in either direction. The upper end of the said sliding plate or bar $k$ is bent backward in a horizontal direction, at shown at $k^2$ in Figs. 4 and 5, and is thus adapted to extend under and engage a finger $m$, attached to the valve-rod $n$ of the syrup-jar, the said finger $m$ at its forward extremity being provided with downwardly-extending lips $m'$, adapted to engage the opposite sides of the rearwardly-extending end of the plate or bar $k$. The jar-receptacles thus constructed are each adapted to receive a jar and, together with its jar, are each adapted to be withdrawn from the case and from the other similar receptacles of said case, and when thus removed the jar may be removed from its receptacle by simply lifting without any preliminary unfastening of parts, the horizontal extension $k^2$, engaging the finger $m$ of the jar-valve, being separable from said finger and permitting the lifting of the jar and its valve connections up and away from the valve-operating devices of the jar-receptacles. The horizontal extensions $k^2$ of the receptacle connections hereinafter referred to and the fingers $m$ are disposed below the upper edges of the frames $g'$, so as not to interfere with the front of the case bordering the opening $a'$ when the receptacles $f$ are pushed into place through said opening.

The valve-rod $n$ is preferably in sections screwed together at $n'$, the lower section being larger than the upper section at the joint to form a spring bearing or shoulder $n^2$. Said rod extends from the outflow-passage $o$ at the bottom of the jar upward through an opening $o'$ through the top of the jar, where said rod projects a little above the said top of the jar, and is provided with the horizontal finger $m$, above referred to. The jar-opening $o'$ for the valve-rod is provided with bearing-pieces $p$ $q$ and a packing $r$ to provide a proper slideway for the valve-rod and form an impervious joint, through which the fluid syrup cannot leak. Said slideway-pieces serve to hold the valve-rod in alinement with the flow-passage $o$ and effect a proper engagement and closure of the valve when said valve-rod is depressed by its spring. The said spring $s$ is arranged on the upper part of the valve-rod, where it is seldom brought into lasting contact with the syrup, and bears upward on the bearing-piece $q$ and downward on the shoulder $n^2$, the spring being under tension normally to hold the valve closed. The lower part of the valve-rod is preferably of hard rubber, which will not be affected by the syrup or vitiate the same and cannot be readily broken, as would glass or the like. At the lower end of the rod the same is made conical and fits the opening $o$ more or less perfectly to produce a nice or impervious joint.

To guard against possible leakage should a particle of solid matter lodge in between the parts of the valve to prevent a perfect closure, I have arranged a little above the conical part a flexible valve-disk $t$, the valve rod or stem being peripherally grooved to receive the same. The disk is of rubber, leather, or the like and bears down upon the bottom of the jar with sufficient firmness to effect the desired tightness of valve-joint.

The jar $f$ is of glass, permitting a free examination of the interior, so that the attendant can immediately observe the amount of syrup contained in the jar. Back from the valve-rod opening $o$ the jar at the top and toward the front is provided with a filling-opening $u$, of a size sufficiently large to permit a convenient pouring of the syrup from the large storage-bottles commonly employed into the jar. Back from the opening $u$ in the jar the top of said jar presents a horizontal flat bearing-surface $f'$, adapted to press upward on the case $a$ at the stay-surface $a^6$, Figs. 4 and 11, above the horizontal front opening of said case, whereby the jar will be held in a horizontal position by the case $a$ when partly withdrawn therefrom, so that the attendant may employ both hands in manipulating the storage-bottle.

By making the jar $f$ narrow and deep, as shown in Figs. 3 and 4, many jars can be arranged side by side in comparatively small space, and yet each jar will be of sufficient capacity.

While I have in positive terms described the invention in its preferred form and construction, I am aware that various modifications or changes may be made without departing from the spirit or scope of the invention, and I do not wish to be understood as limiting myself by the foregoing description excepting as the state of the art may require.

Having thus described the invention, what I claim as new is—

1. In a fountain for dispensing soda-water, &c., the combination with the case, $a$, having a horizontal partition $b$, forming a chamber $d$, open at the front, as at $a'$, the said opening being undivided by vertical partitions, a series of sliding jar-receptacles $e$, independent of and separable from the jars and separable from the case $a$, and arranged side by side in said chamber and opening, said sliding jar-receptacles comprising perforated front plates $g$, extending from top to bottom of said opening, frames for holding said front plates, receptacle-bodies $e'$, fastened to said frames and having their bottoms open at or near the front, cam-rods $h$, arranged in the perforations of the front plates and having handles at their outer ends and lateral lifting extensions $j$, at their inner ends sliding plates or bars $k$, arranged in ways formed behind said front plates and engaged by said lifting extensions at their lower ends and at their upper ends bent backward into engagement with fingers $m$, of valve-rods, and jars having upper and lower openings for the valve-rods and filling-openings, said valve-rods having said fingers and adapted to close the lower opening to prevent the escape of fluid, all said parts being arranged and operating, substantially as set forth.

2. In a fountain for dispensing liquids, the combination with the case $a$, having a chamber open at the front, of a series of syrup-jars and receptacles therefor, each jar being furnished with an individual receptacle removable from the case $a$, and from which receptacle the jar is removable, the front plates of said receptacles being arranged side by side in said case and each receptacle having a handled rod, provided at its inner end with oppositely-extending fingers for opening the one valve of the jar contained in the receptacle having said rod, and means engaged by said fingers adapted to raise the valve-rod to its open position when the handle is turned in either direction, said jars being provided with said valve-rods separable from and adapted to be operated by the lifting-fingers and means engaged by said lifting-fingers, substantially as set forth.

3. In a fountain for dispensing soda, &c., the combination with the jar-receptacle adapted to be arranged in the open chamber of the fountain and having a forked sliding plate or bar at the front and a rod with opposite projections to engage the prongs of the fork and a handle for turning said rod, of a jar separable from its receptacle and having a valve-rod extending through the bottom and top of said jar, a spring for holding the rod in closed relation to the bottom opening and means separably connecting the sliding plate and valve-rod, and permitting a separation of the jar from its receptacle, without disturbing the position of the valve, substantially as set forth.

4. In a fountain for dispensing soda, &c., the combination with the jar-receptacle separable from the case, and having a vertically-sliding plate or bar with a forked lower end and a handled cam with opposite lifting-fingers to engage the prongs of said bar or plate, of a jar arranged in said receptacle and open at bottom and top, a valve-rod extending down through the top opening and closing the bottom opening, a spring for holding the rod in close relation to said bottom opening and a separable connection of said sliding plate and rod, all said parts being arranged and combined, substantially as set forth.

5. In a soda-water fountain, the combination with the case, of a jar-receptacle separable from the case, a jar separable from the receptacle, the said case having at its front a forked plate, and a rod with oppositely-projecting fingers and a handle, the weight of said sliding rod and the handle of the said rod serving to cause said rod and plate to assume normal positions in connection with the closed valve, automatically, without the use of a spring, substantially as set forth.

6. In a soda-water fountain, the combination with the case, of a jar-receptacle having at its front, a frame or plate providing at its back a slideway, and below said slideway a box or bearing for an oscillating shaft $h$, a sliding plate or bar having at one end a fork and at the upper end adapted to operate valve devices, a rod having at its inner end a cam and at its outer end a suspended handle, the handle tending normally to hold the cam projections in position to engage both prongs of the forked plate, substantially as set forth.

In testimony that I claim the foregoing I have hereunto set my hand this 4th day of January, 1899.

CHARLES H. CLARK.

Witnesses:
CHARLES H. PELL,
C. B. PITNEY.